US011639197B2

(12) United States Patent
Gallagher et al.

(10) Patent No.: US 11,639,197 B2
(45) Date of Patent: May 2, 2023

(54) REINFORCED RAIL ASSEMBLY

(71) Applicant: Ford Global Technologies, LLC, Dearborn, MI (US)

(72) Inventors: Stephen William Gallagher, Bloomfield Hills, MI (US); Vladimir Vladimirovich Bogachuk, West Bloomfield, MI (US); Musheeruddin Syed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 17/067,105

(22) Filed: Oct. 9, 2020

(65) Prior Publication Data
US 2022/0111896 A1 Apr. 14, 2022

(51) Int. Cl.
*B62D 21/02* (2006.01)
*B62D 27/02* (2006.01)
*B62D 21/15* (2006.01)

(52) U.S. Cl.
CPC ............. *B62D 21/02* (2013.01); *B62D 21/15* (2013.01); *B62D 27/023* (2013.01)

(58) Field of Classification Search
CPC ....... B62D 21/02; B62D 21/15; B62D 27/023
USPC ........................................... 296/29, 205, 30
See application file for complete search history.

(56) References Cited

U.S. PATENT DOCUMENTS

| | | | |
|---|---|---|---|
| 9,868,465 B2 | 1/2018 | Kurokawa | |
| 10,442,466 B2 * | 10/2019 | Narahara | B62D 21/152 |
| 2001/0039780 A1 * | 11/2001 | Matsuki | B62D 29/04 428/140 |
| 2006/0005503 A1 * | 1/2006 | Bladow | E04C 3/28 156/130.7 |
| 2012/0043019 A1 * | 2/2012 | Belpaire | B62D 21/09 428/131 |
| 2013/0140850 A1 * | 6/2013 | Tyan | B62D 21/15 296/187.03 |
| 2019/0016389 A1 * | 1/2019 | Kamei | B60R 19/34 |
| 2019/0039653 A1 * | 2/2019 | Otsuka | B62D 27/023 |
| 2020/0239080 A1 * | 7/2020 | Kagami | B62D 21/08 |
| 2021/0179180 A1 * | 6/2021 | Lee | B62D 27/026 |

FOREIGN PATENT DOCUMENTS

| | | |
|---|---|---|
| CN | 105365887 B | 10/2017 |
| KR | 2007-0020785 A | 2/2007 |
| KR | 2015-0029422 A | 3/2015 |

* cited by examiner

*Primary Examiner* — D Glenn Dayoan
*Assistant Examiner* — E Turner Hicks
(74) *Attorney, Agent, or Firm* — Burris Law, PLLC (57) ABSTRACT

The present disclosure relates to a rail assembly that includes an outer rail and an inner rail opposite to the outer rail. The rail assembly also includes a cavity formed between the outer rail and the inner rail. The rail assembly further includes a first corner reinforcement coupled to the outer rail and the inner rail in such a way that at least a portion of the first corner reinforcement is located in the cavity. The rail assembly also includes a second corner reinforcement coupled to the outer rail and the inner rail in such a way that at least a portion of the first corner reinforcement is located in the cavity.

20 Claims, 10 Drawing Sheets

REINFORCED RAIL ASSEMBLY

BACKGROUND

Technical Field

The present disclosure generally relates to a reinforced vehicle rail assembly.

Description of the Related Art

Vehicles generally include energy-absorbing structures. An example of such energy-absorbing structures is a front rail of a vehicle. It may be desirable to have front rails that have sufficient rigidity while meeting durability and other performance criteria.

BRIEF SUMMARY

The present disclosure is directed to front rail assemblies that may improve energy absorbing capabilities and bending capacity of vehicles.

In one embodiment, a rail assembly of the present disclosure includes an outer rail and an inner rail opposite to the outer rail. The rail assembly also includes a cavity formed between the outer rail and the inner rail. The rail assembly further includes a first corner reinforcement coupled to the outer rail and the inner rail in such a way that at least a portion of the first corner reinforcement is located in the cavity. The rail assembly also includes a second corner reinforcement coupled to the outer rail and the inner rail in such a way that at least a portion of the second corner reinforcement is located in the cavity.

In one example, the outer rail includes an outer web having a first web protrusion and the inner rail includes a second web protrusion that extends outwardly into the cavity. According to an example, the bulkhead includes a first bulkhead and a second bulkhead that are spaced apart in a longitudinal direction. Further, the first bulkhead and the second bulkhead define an opening that is sized to receive a barrel nut.

In another embodiment, a rail assembly of the present disclosure includes an outer rail having an outer rail web and an inner rail having an inner rail web. Further, the outer rail web and the inner rail web are spaced apart laterally to define a cavity. The rail assembly includes one or more bulkheads positioned in the cavity. Further, each bulkhead has a first flange that is adjacent to the outer rail and the second flange adjacent to the inner rail.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
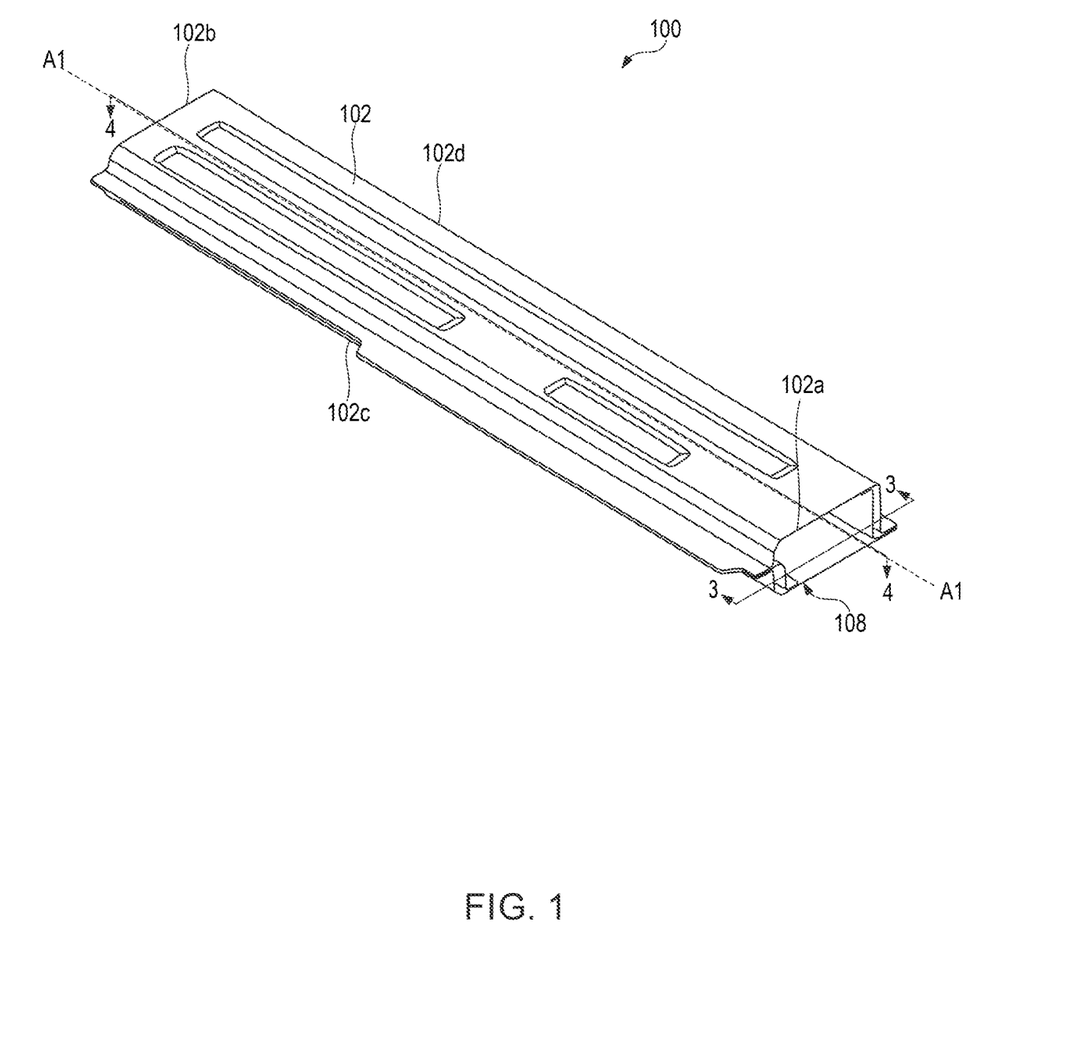
FIG. 1 illustrates an isometric view of a rail assembly in accordance with one embodiment of the present disclosure.
Figure 2:
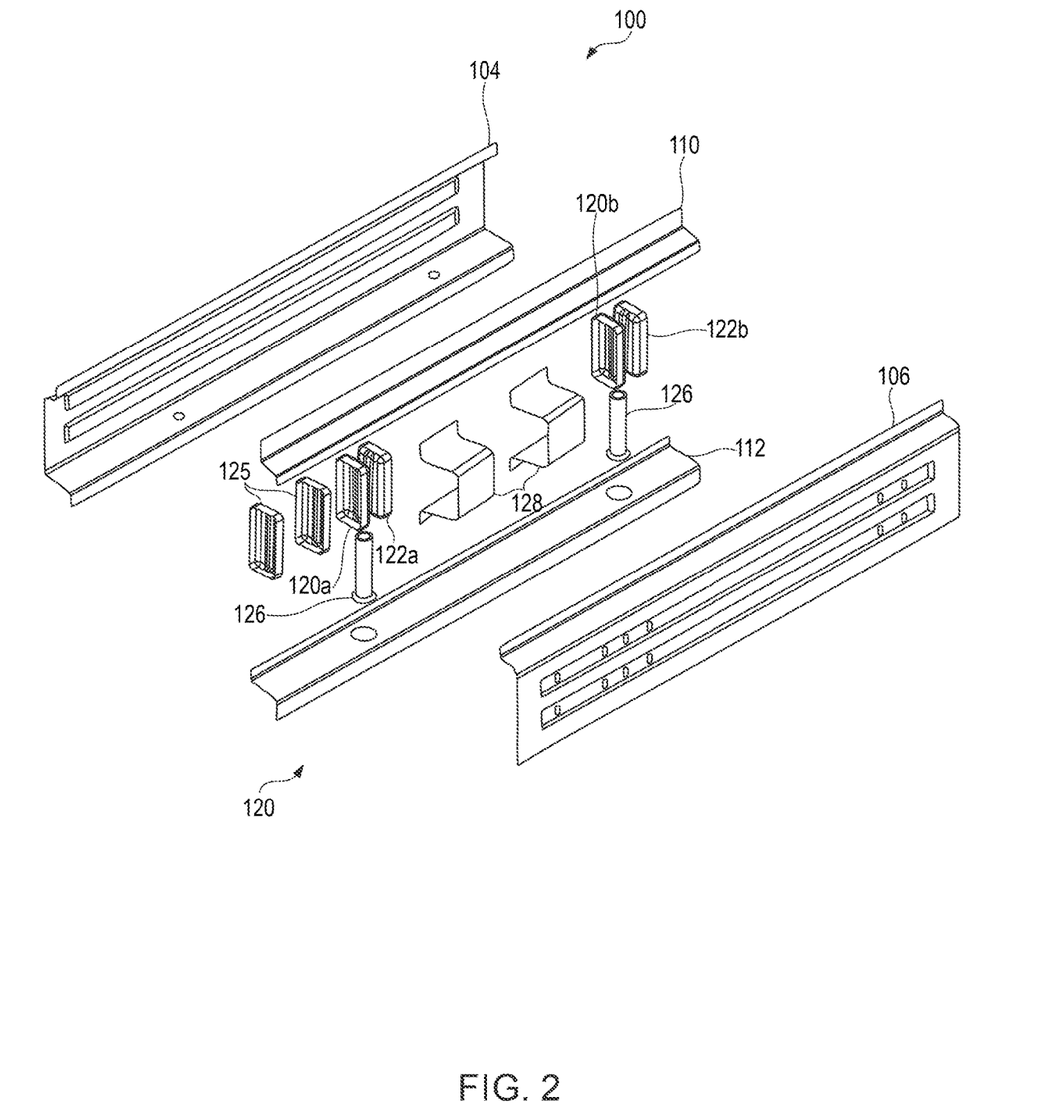
FIG. 2 illustrates an exploded view of the rail assembly of FIG. 1.
Figure 3:
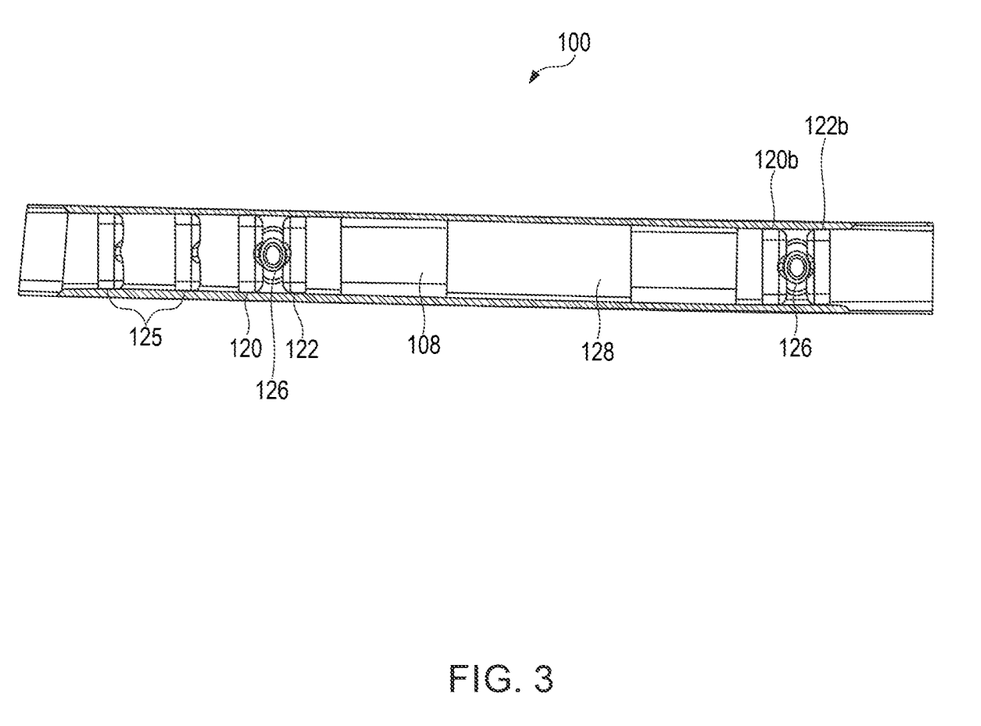
FIG. 3 illustrates a section view of the rail assembly, taken along line 3-3 in FIG. 1.
Figure 4:
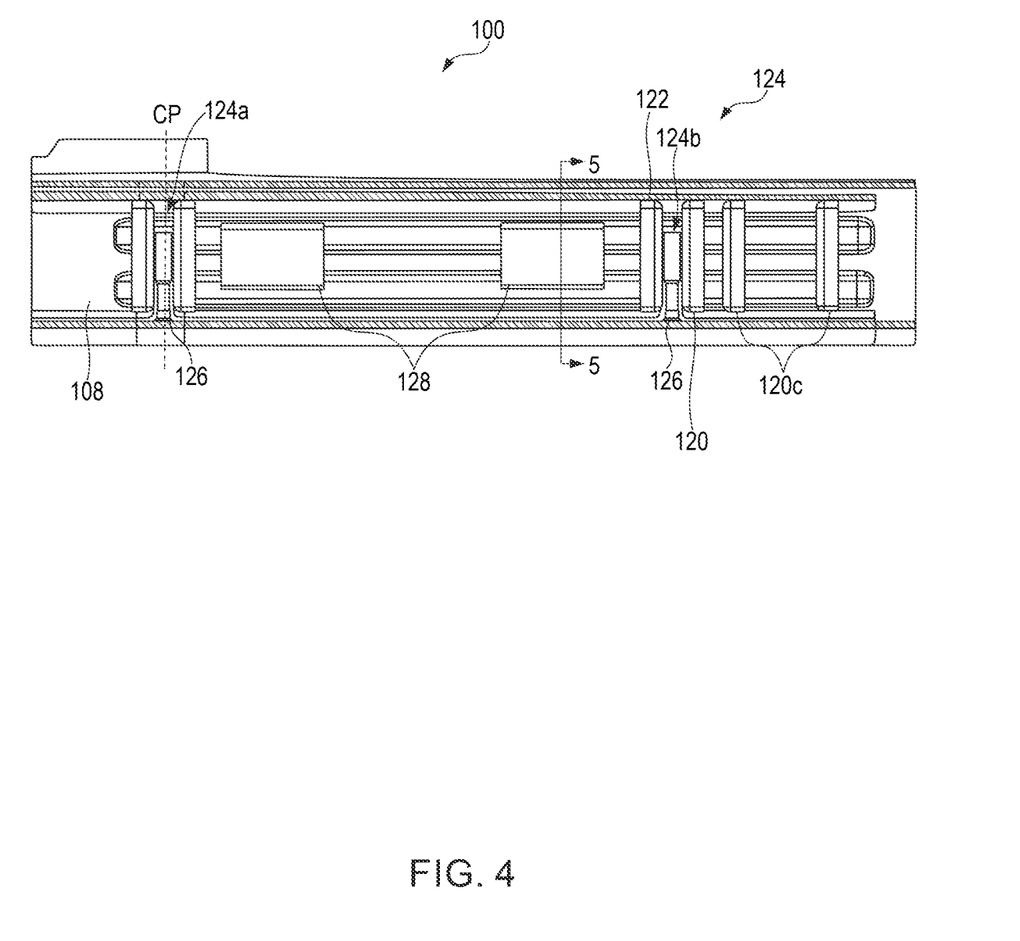
FIG. 4 illustrates a section view of the rail assembly, taken along line 4-4 in FIG. 1.
Figure 5:
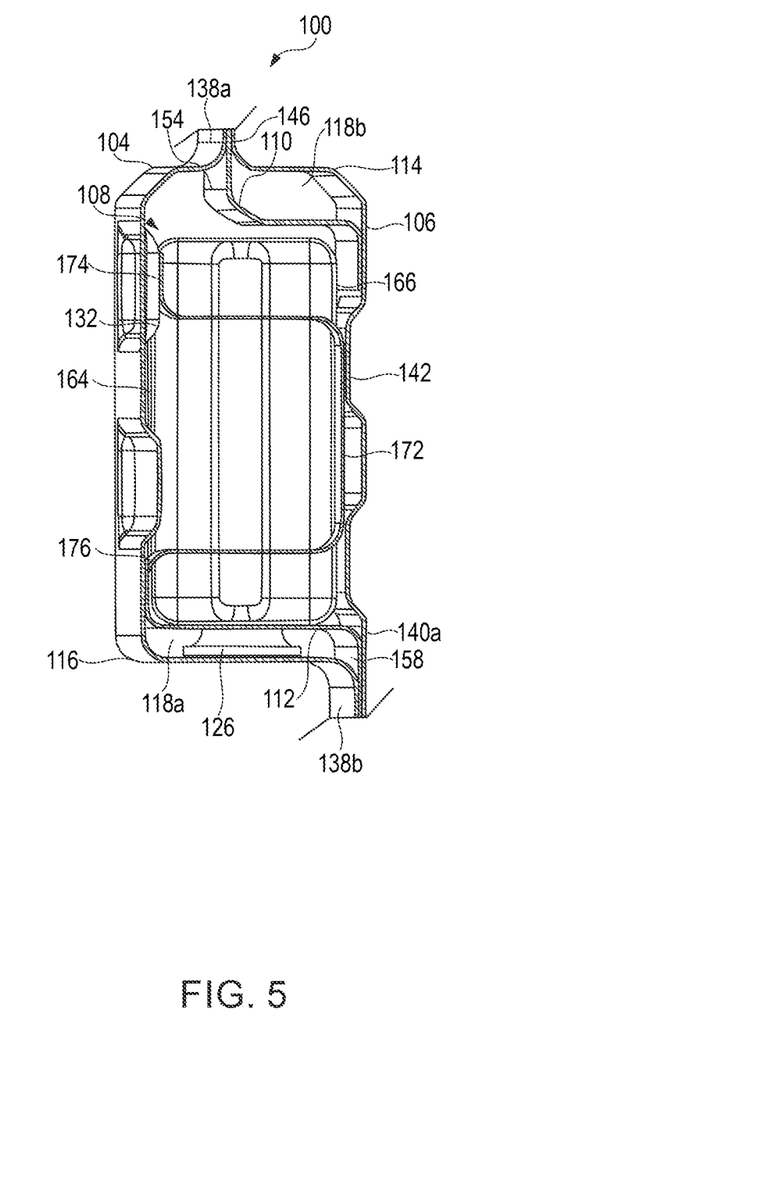
FIG. 5 illustrates a section view of the rail assembly, taken along line 5-5 in FIG. 4.

FIGS. 1 to 5 illustrate various views of a rail assembly 100, in accordance with one embodiment of the present disclosure. In particular, FIG. 1 illustrates an isometric view of the rail assembly 100 and FIG. 2 illustrates an exploded view of the rail assembly 100. FIGS. 3-5 illustrate various section views of the rail assembly 100. In some embodiments, the rail assembly 100 can be included in a front bumper of a vehicle, rear torque box of a vehicle, or similar energy-absorbing structures of a vehicle.

As shown in FIG. 1, the rail assembly 100 includes a body 102, which has a first end 102a, e.g., an end that may face a front portion of a vehicle, and a second end 102b, e.g., an end that may face a cabin compartment of the vehicle. The body 102 of the rail assembly 100 includes a first side 102c, e.g., a side that may face a side of the vehicle, and a second side 102d, e.g., a side that may face an engine compartment of the vehicle.

The rail assembly 100 is generally configured to absorb energy of an impact received during various impact scenarios, for example, a front impact, an offset frontal impact, and other impact scenarios. As illustrated and described in more detail below, the rail assembly 100 includes various components that enable the rail assembly 100 to absorb energy of impacts while reducing the overall weight of the rail assembly 100.

With reference to FIGS. 1-5, the rail assembly 100 includes an outer rail 104 and an inner rail 106 that forms the body 102 of the rail assembly 100. The outer rail 104 and the inner rail 106 are coupled to each other, and arranged to form a cavity 108 therebetween, which extends along a length of the rail assembly 100, as shown in more detail in FIG. 1.

The rail assembly 100 includes a first corner reinforcement 110 and a second corner reinforcement 112. The first and second corner reinforcements 110, 112 are mounted inside the cavity 108, and coupled to the inner rail 106 and the outer rail 104, for example, via welding, fastening, or similar coupling structures. The first corner reinforcement 110 is mounted adjacent to a first corner 114 of the inner rail 106 and the second corner reinforcement 112 is mounted adjacent to a first corner 116 of the outer rail 104. The first and second corner reinforcements 110, 112 are generally sized, shaped, and arranged to reinforce the outer rail 104 and the inner rail 106. For example, the arrangement of the first and second corner reinforcements 110, 112 provides a first section 118a and a second section 118b within the cavity 108, which improve load distribution of an impact received along a central axis A1 (FIG. 1). Thus, during impact, portions of the energy may be absorbed by the first corner reinforcements 110 and the second corner reinforcement 112. In addition, the first and second corner reinforcements 110, 112 may also improve bending capacity of the rail assembly 100, and of the vehicle.

The rail assembly 100 includes a plurality of bulkheads that reinforce the rail assembly 100. For example, the rail assembly 100 includes a plurality of first bulkheads 120a, 120b, collectively to referred to as first bulkheads 120, that are positioned in the cavity 108 as shown in FIG. 2. In one example embodiment, the first bulkhead 120 abuts the outer rail 104 and the inner rail 106. In addition, the rail assembly 100 includes a plurality of second bulkheads 122a, 122b, collectively referred to as second bulkheads 122, that are that are positioned in the cavity 108. The first bulkhead 120 and the second bulkhead 122 are spaced apart from each other at openings 124a, 124b between the first and second bulkheads 120, 122, collectively referred to as the openings 124. The openings 124 are sized and shaped to allow fasteners, such as, for example, a barrel nut 126, to pass therethrough. The fasteners, for example, barrel nuts 126, generally, couple to certain vehicle attachments, such as, for example, subframe attachments. The first and second bulkheads 120, 122 are sized, shaped, and arranged to reinforce the barrel nuts 126, such that the rail assembly 100 can withstand certain road loads experienced by a vehicle due, at least, in part to the subframe attachments.

As illustrated in FIGS. 2-4 in more detail, the first bulkhead 120 and the second bulkhead 122 are generally similar, but are arranged to be a mirror image of each other relative to a central plane CP, as shown in FIG. 4.

The rail assembly 100 further includes third bulkheads 125 that are positioned in the cavity 108, toward the first end 102a of the body 102, and adjacent to the first bulkhead 120 and the second bulkhead 122 as shown in FIGS. 2 and 3. The third bulkheads 125 are generally similar to the first and second bulkheads 120, 122. In contrast to the first and second bulkheads 120, 122, however, the third bulkheads 125 are not arranged to be a mirror image of each other, and rather are arranged to face toward a same direction. The third bulkheads 125 are generally sized, shaped, and arranged in the cavity 108 to provide sectional stability, for example, in a frontal impact scenario.

The rail assembly 100 also includes a plurality of fourth bulkheads 128 that are generally sized, shaped, and arranged to provide sectional stability, for example, when the rail assembly 100 experiences bending loads, and improve bending capacity of the rail assembly 100, and of the vehicle.

Figure 6:
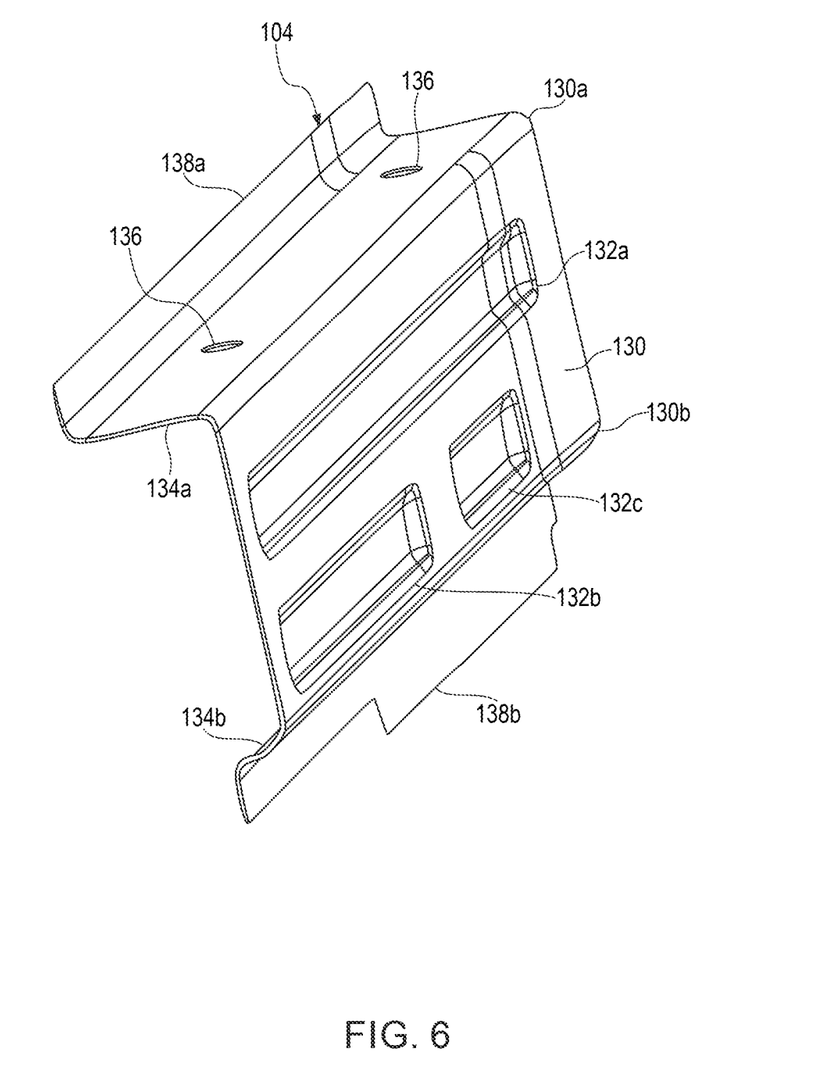
FIG. 6 illustrates a skewed isometric view of an outer rail of the rail assembly of FIG. 1, in accordance with one embodiment of the present disclosure.

FIGS. 6-10 illustrate detail views of the various components of the rail assembly 100 described above. In particular, FIG. 6 illustrates the outer rail 104, in accordance with one embodiment of the present disclosure. The outer rail 104 has a generally U-shape profile and includes a web 130 and a plurality of web protrusions 132a, 132b, 132c (collectively referred to as web protrusions 132) that extend from the web 130 into the cavity 108. The web protrusions 132, when received in the cavity 108, abut the first bulkhead 120 and the second bulkhead 122 as shown in FIG. 5.

The outer rail 104 also includes a first outer base flange 134a that extends orthogonally from one end 130a of the outer web 130. The first outer base flange 134a includes a pair of the apertures 136 that are sized and shaped to receive therethrough fasteners, such as the barrel nut 126. The outer rail 104 also includes a first outer upstanding flange 138a that extends orthogonally from the first outer base flange 134a.

The outer rail 104 includes a second outer base flange 134b that extends from another end 130b of the outer web 130, and a second outer upstanding flange 138b that extends from the second outer base flange 134b. As shown in FIG. 6, in one embodiment, the second outer upstanding flange 138b extends in a direction opposite to that of the first outer upstanding flange 138a.

When the outer rail 104 is coupled to the inner rail 106, the first outer upstanding flange 138a is positioned adjacent to an end of the inner rail 106 and an end of the first corner reinforcement 110. Similarly, the second outer upstanding flange 138b is positioned adjacent to an end of the inner rail 106 and an end of the second corner reinforcement 112.

Figure 7:
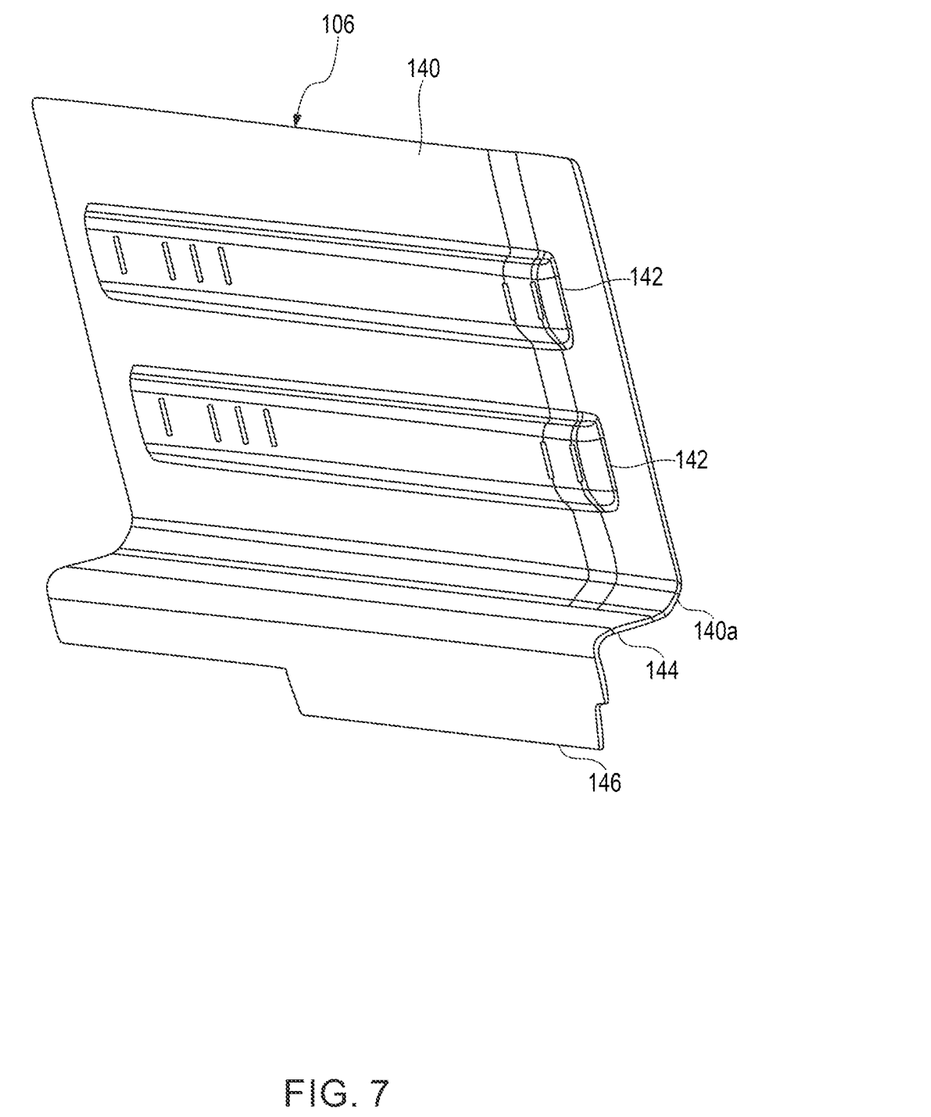
FIG. 7 illustrates a skewed isometric view of inner rail of the rail assembly of FIG. 1, in accordance with one embodiment of the present disclosure.

FIG. 7 illustrates the inner rail 106, in accordance with an embodiment of the present disclosure. The inner rail 106 has a generally S-shaped profile and includes an inner rail web 140 and a plurality of inner web protrusions 142 that extend along a length of the inner rail 106. The inner rail 106 includes an inner base flange 144 that extends from one end 140a of the inner rail web 140 and defines an inner wall of the cavity 108 as shown in FIG. 5. The inner rail 106 also includes a first inner upstanding flange 146 that extends from the inner base flange 144. When the inner rail 106 is coupled to the outer rail 104, the first inner upstanding flange 146 is positioned adjacent to the first outer upstanding flange 138a.

Figure 8A:
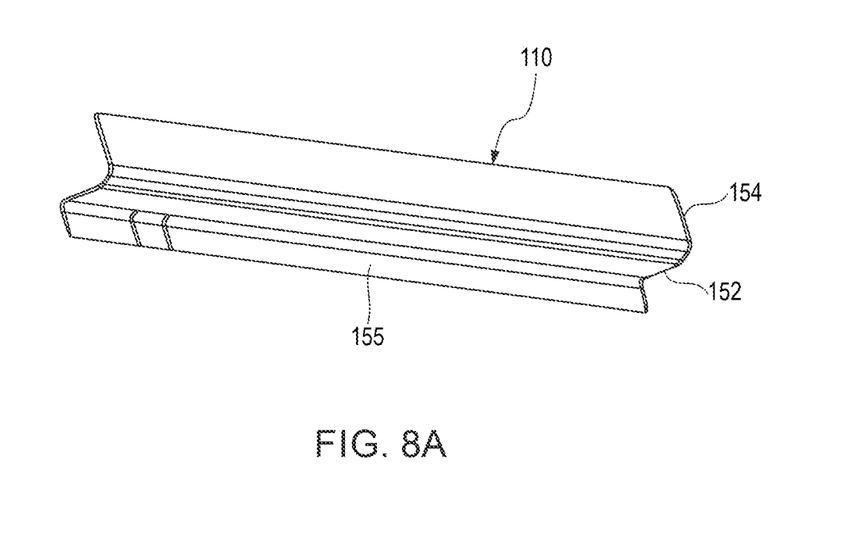
FIG. 8A illustrates a skewed isometric view of a corner reinforcement of the rail assembly of FIG. 1, in accordance with one embodiment of the present disclosure.
Figure 8B:
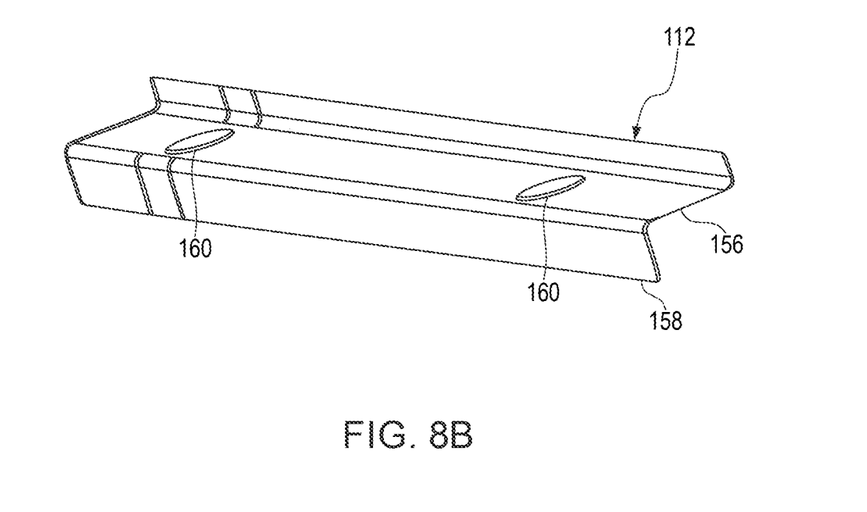
FIG. 8B illustrates a skewed isometric view of another corner reinforcement of the rail assembly of FIG. 1, in accordance with one embodiment of the present disclosure.

FIGS. 8A and 8B illustrate the first corner reinforcement 110 and the second corner reinforcement 112, respectively, in more detail. As shown in FIG. 8A, the first corner reinforcement 110 includes a first base corner flange 152, a first upstanding corner flange 154 that extends from the first base corner flange 152, and a second corner upstanding flange 155 that extends from the first upstanding corner flange 154. When the first corner reinforcement 110 is coupled to the inner rail 106 and outer rail 104, the first upstanding corner flange 154 is sandwiched between the first outer upstanding flange 138a and the first inner upstanding flange 146, as shown in FIG. 5.

As shown in FIG. 8B, the second corner reinforcement 112 includes a second base corner flange 156 and a second corner upstanding flange 158 that extends from the second base corner flange 156. The second corner upstanding flange 158 is sandwiched between an end portion 140a of the inner rail web 140 and the second outer upstanding flange 138b as shown in FIG. 5. Further, the second base corner flange 156 includes a pair of corner apertures 160, which are sized and shaped to receive the barrel nuts 126, and align with the apertures 136 of the outer rail 104.

Figure 9:
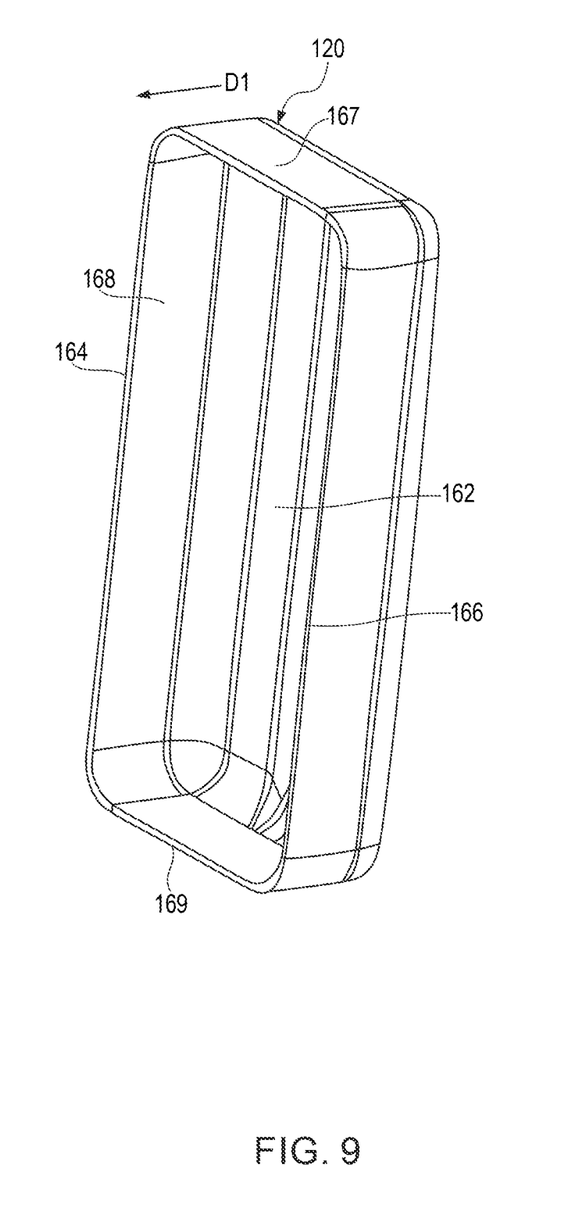
FIG. 9 illustrates a skewed isometric view of a bulkhead of the rail assembly of FIG. 1, in accordance with one embodiment of the present disclosure.

As described above, the first bulkhead 120, the second bulkhead 122, and the third bulkhead 125 are generally similar. Thus, in the interest of brevity, only the first bulkhead 120 is shown in more detail in FIG. 9. As shown in FIG. 9, the first bulkhead 120 has a U-shape profile and includes a first base plate 162. The first bulkhead 120 also includes a first flange 164 that extends outwardly from one end of the first base plate 162 along a longitudinal direction D1. The first bulkhead 120 also includes a second flange 166, a third flange 167, and a fourth flange 169 extending from ends of the first base plate 162. The first, second, third, and fourth flanges 164, 166, 167, 169 collectively form a first peripheral wall 168. When positioned in the cavity 108, the first flange 164 and the second flange 166 abut the web protrusions 132 and the inner web protrusions 142 respectively, as shown in more detail in FIG. 5.

Figure 10:
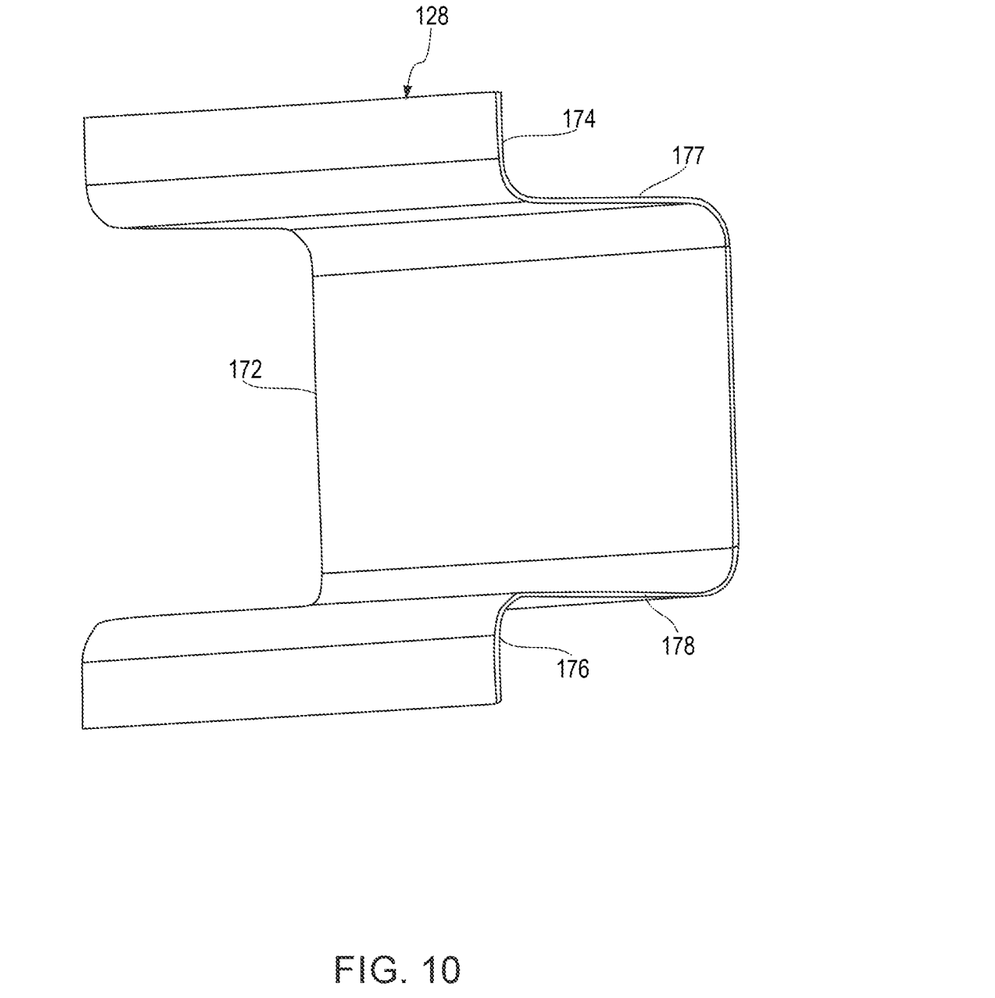
FIG. 10 illustrates a skewed isometric view of another bulkhead of the rail assembly of FIG. 1, in accordance with one embodiment of the present disclosure.

FIG. 10 illustrates the fourth bulkhead 128, in accordance with one embodiment of the present disclosure, in more detail. The fourth bulkhead 128 includes a base plate 172, a first base flange 174, a second base flange 176, a third straight flange 177 extending between the base plate 172 and the first base flange 174, and a fourth straight flange 178 extending between the base plate 172 and the second base flange 176. The base plate 172, first base flange 174, second base flange 176, third straight flange 177, and fourth straight flange 178 collectively define a hat-shaped structural shape of the fourth bulkhead 128. As shown in FIG. 5 in more detail, when positioned in the cavity 108, the first base plate 172 of the fourth bulkhead 128 abuts the inner web protrusion 142, and the first base flange 174 abuts the web protrusion 132.

The various embodiments described above can be combined to provide further embodiments. Moreover, these and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rail assembly, comprising:
an outer rail;
an inner rail coupled to the outer rail;
a cavity located between the outer rail and the inner rail;
a first corner reinforcement coupled to the outer rail and the inner rail, at least a portion of the first corner reinforcement located in the cavity; and
at least one or more bulkheads located in the cavity and spaced apart from the first corner reinforcement.

2. The rail assembly of claim 1, further comprising:
a second corner reinforcement coupled to the outer rail and the inner rail, at least a portion of the second corner reinforcement located in the cavity.

3. The rail assembly of claim 1 wherein:
the outer rail includes a first outer upstanding flange and a second outer upstanding flange; and
the inner rail includes a first inner upstanding flange and an inner rail web, the first inner upstanding flange arranged to be adjacent to the first outer upstanding flange, and an end portion of the inner rail web arranged to be adjacent to the second outer upstanding flange.

4. The rail assembly of claim 3 wherein the first corner reinforcement includes a first corner upstanding flange that is sandwiched between the first inner upstanding flange and the first outer upstanding flange.

5. The rail assembly of claim 3 wherein a second corner reinforcement includes a second corner upstanding flange that is sandwiched between the end portion of the inner rail web and the second outer upstanding flange.

6. The rail assembly of claim 3 wherein the outer rail includes an outer web having a first web protrusion extending outwardly into the cavity and the inner rail web includes a second web protrusion extending outwardly into the cavity, the first and second web protrusions arranged to abut the at least one or more bulkheads.

7. The rail assembly of claim 1 wherein the at least one or more bulkheads includes a first bulkhead and a second bulkhead, the first bulkhead and the second bulkhead spaced apart in a longitudinal direction.

8. The rail assembly of claim 7 wherein the first and second bulkheads are spaced apart to define an opening, the opening sized and shaped to receive a barrel nut.

9. The rail assembly of claim 7 wherein the first bulkhead includes a first base plate and a first peripheral wall extending outwardly from the first base plate, and the second bulkhead includes a second base plate and a second peripheral wall extending outwardly from the second base plate.

10. The rail assembly of claim 9 wherein the second bulkhead is arranged to be a mirror image of the first bulkhead about a central plane.

11. The rail assembly of claim 7 wherein the at least one or more bulkheads includes a third bulkhead located in the cavity and adjacent to the first and second bulkheads.

12. The rail assembly of claim 11 wherein the third bulkhead includes a hat-shaped structural shape.

13. A vehicle rail assembly, comprising:
an outer rail having an outer rail web;
an inner rail having an inner rail web, the inner rail web and the outer web rail spaced apart laterally to define a cavity;
a first corner reinforcement disposed within the cavity; and
one or more bulkheads positioned in the cavity and spaced apart from the first corner reinforcement, the one or more bulkheads having a first flange adjacent the outer rail web and a second flange adjacent the inner rail web.

14. The vehicle rail assembly of claim 13 wherein:
the outer rail includes a first outer base flange extending outwardly from the outer rail web, and a first outer upstanding flange extending outwardly from the first outer base flange; and
the inner rail includes a first inner base flange extending outwardly from the inner rail web, and a first inner upstanding flange extending outwardly from the first inner base flange.

15. The vehicle rail assembly of claim 14, further comprising
a second corner reinforcement.

16. The vehicle rail assembly of claim 15 wherein the first corner reinforcement includes a first base corner flange and a first upstanding corner flange, the first upstanding corner flange positioned adjacent to the inner rail web.

17. The vehicle rail assembly of claim 15 wherein the second corner reinforcement includes a second base corner flange and a second upstanding corner flange, the second upstanding corner flange positioned adjacent to the outer rail web.

18. The vehicle rail assembly of claim 13 wherein the first and second flanges of the one or more bulkheads comprise a peripheral wall that extends outwardly from a web of the one or more bulkheads.

19. The vehicle rail assembly of claim 13 wherein the one or more bulkheads includes a first bulkhead and a second bulkhead, the first bulkhead and the second bulkhead spaced apart in a longitudinal direction.

20. The vehicle rail assembly of claim 19 wherein the first and second bulkheads are spaced apart to define an opening, the opening sized and shaped to receive a barrel nut.

* * * * *